C. A. YOUNGMAN.
FILTER.
APPLICATION FILED NOV. 3, 1914.
1,131,456.
Patented Mar. 9, 1915.
5 SHEETS—SHEET 5.
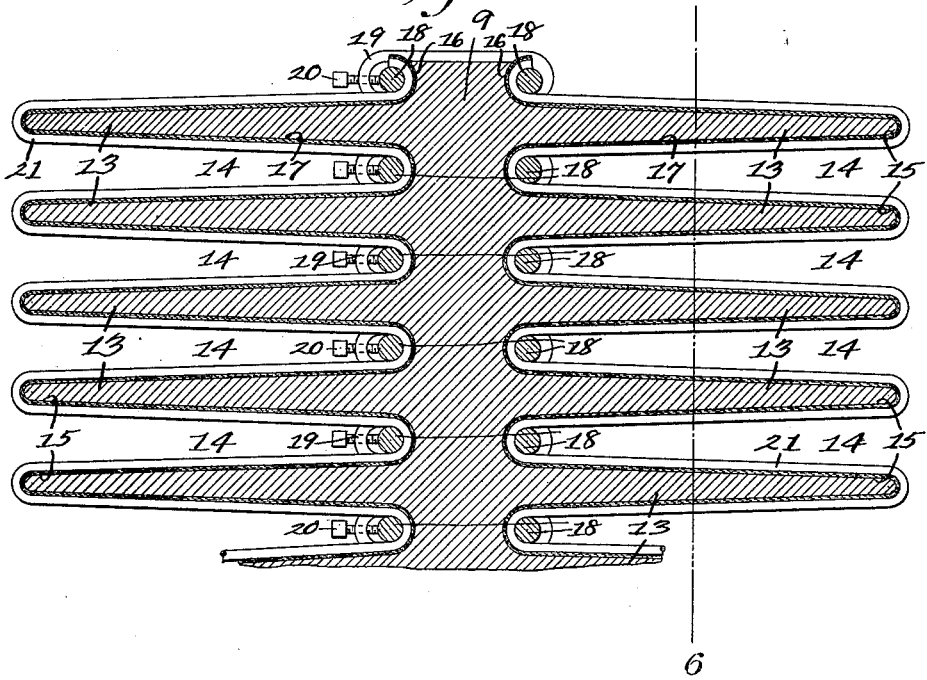
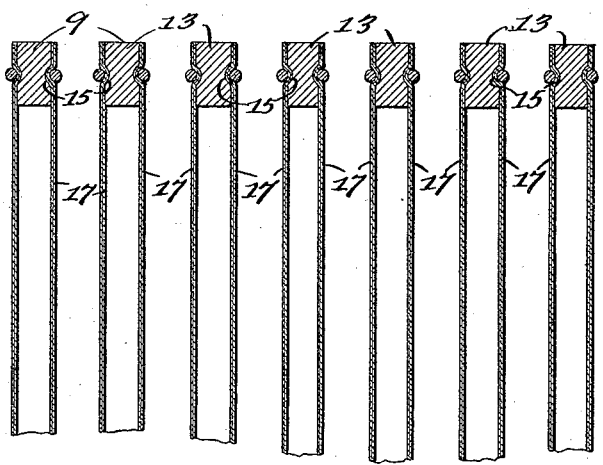
WITNESSES
INVENTOR
Charles A. Youngman
BY
ATTORNEYS
THE NORRIS PETERS CO., PHOTO-LITHO., WASHINGTON, D. C.

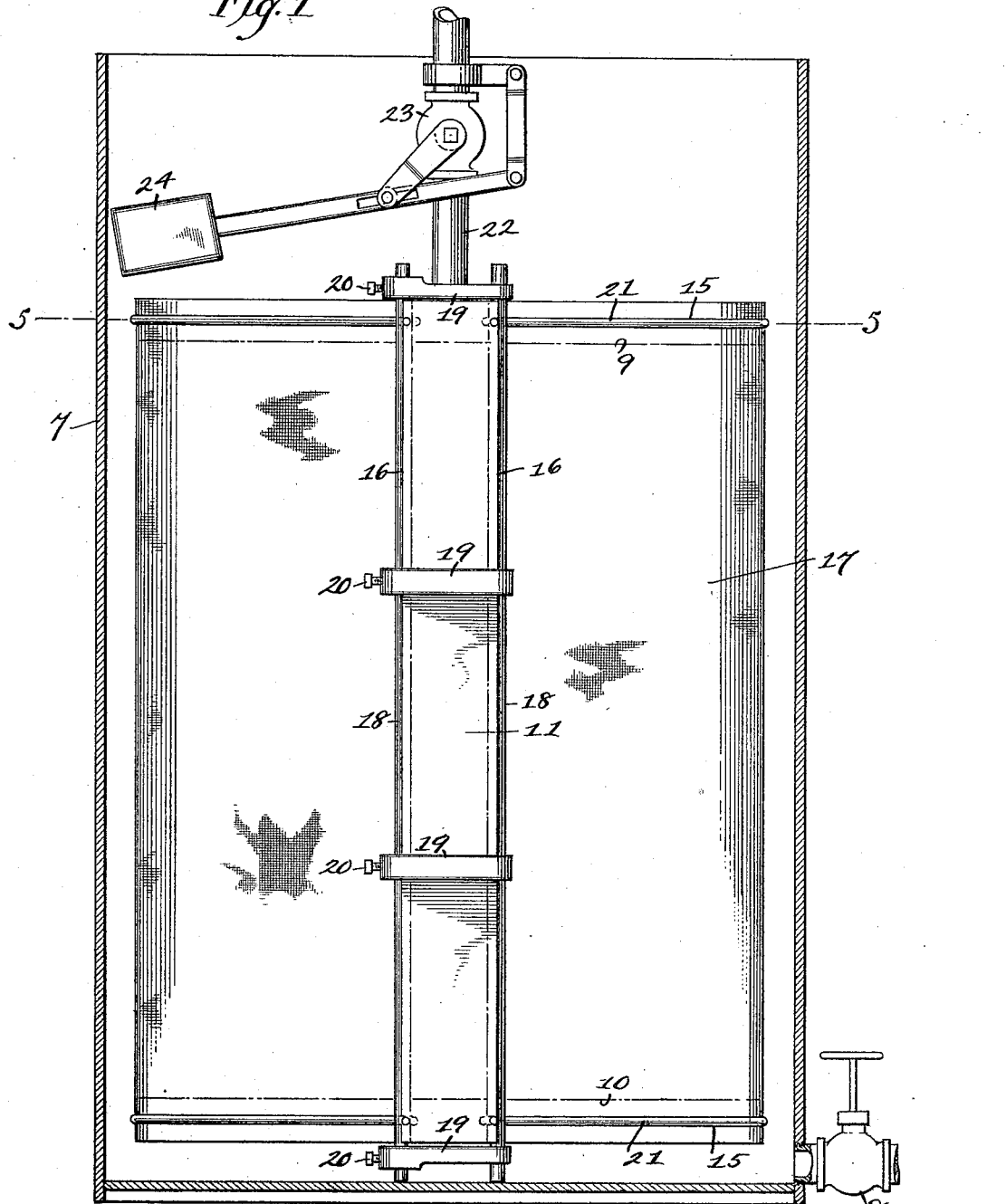

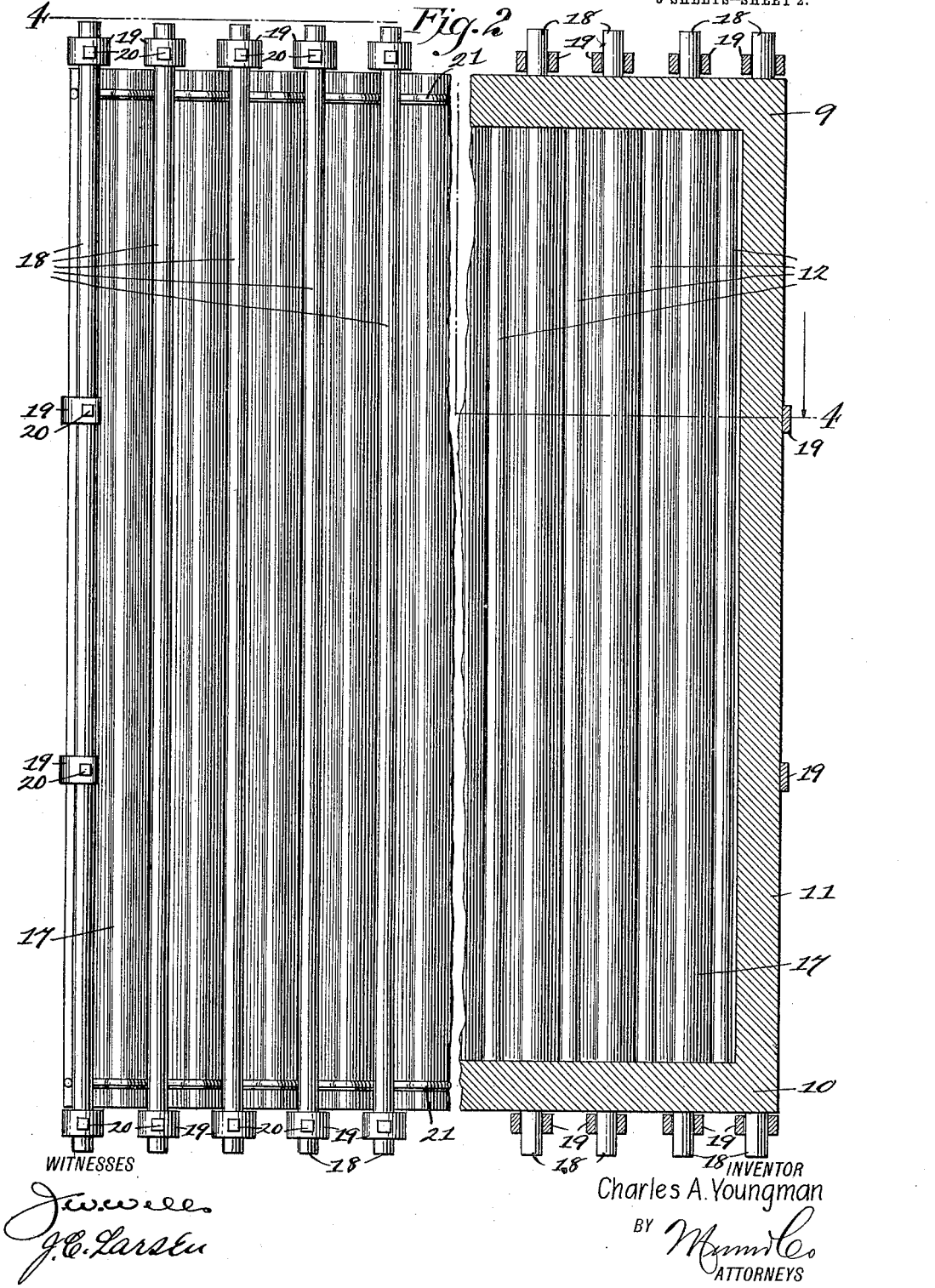

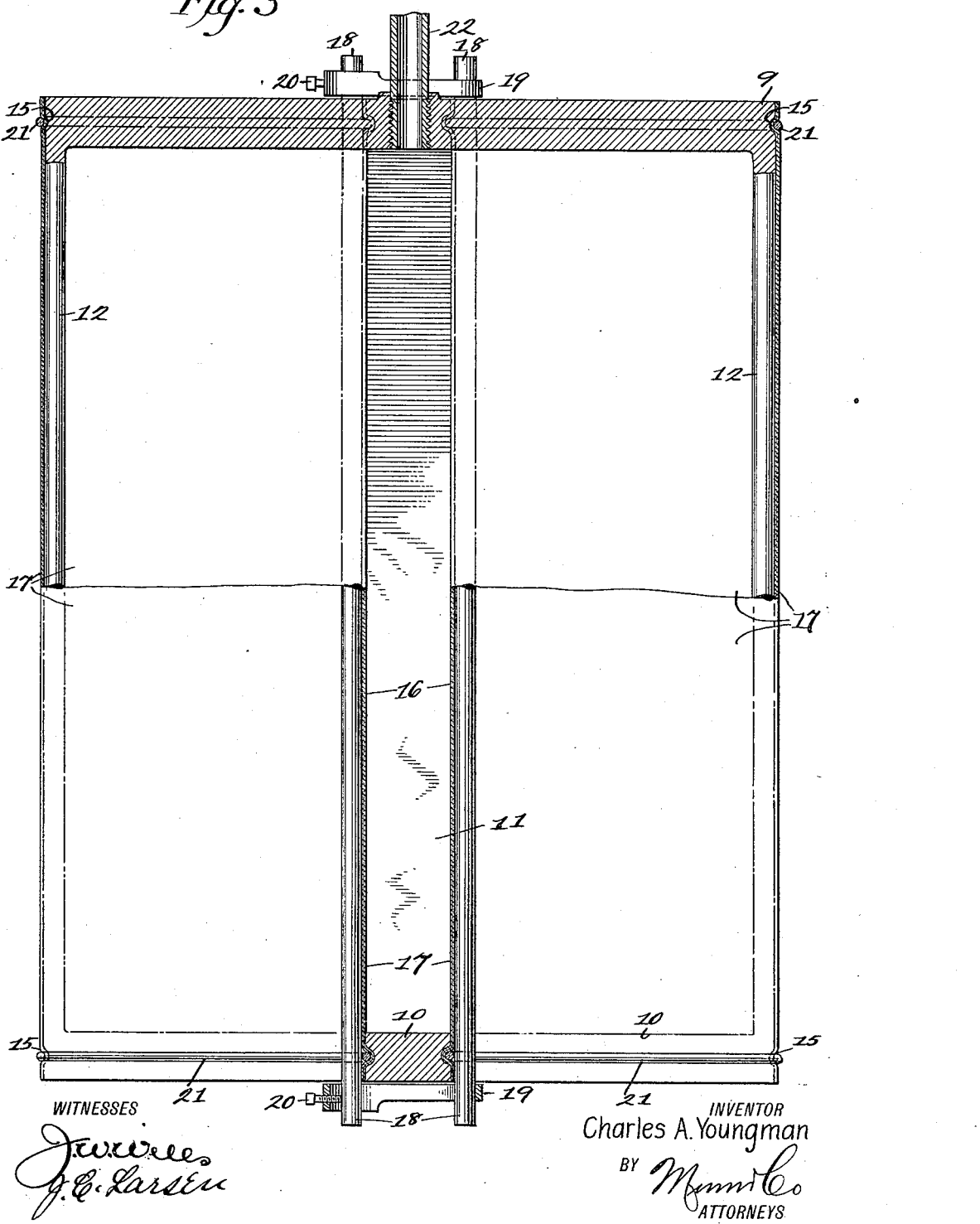

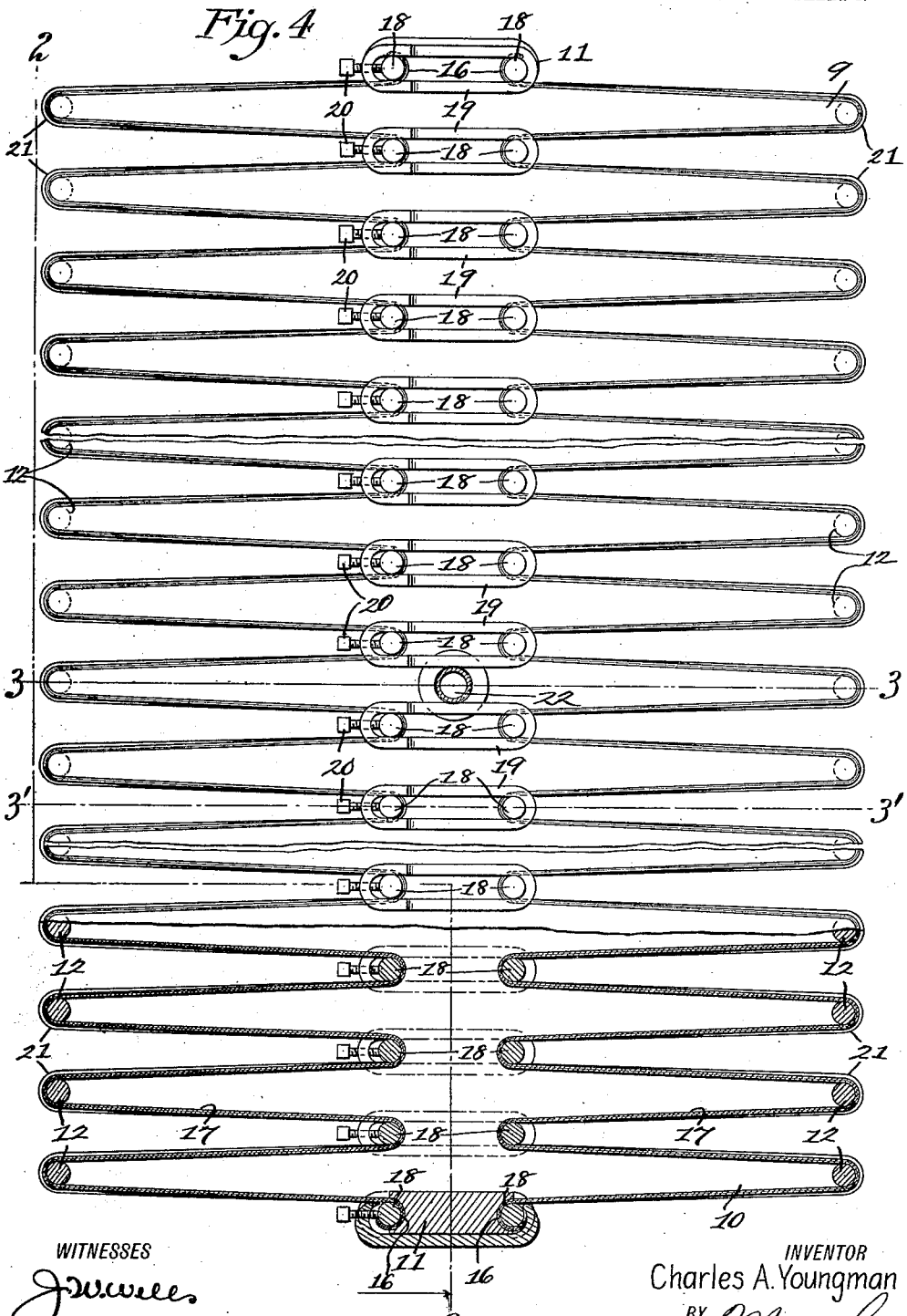

UNITED STATES PATENT OFFICE.

CHARLES ALBERT YOUNGMAN, OF LOUISVILLE, KENTUCKY.

FILTER.

1,131,456. Specification of Letters Patent. Patented Mar. 9, 1915.

Application filed November 3, 1914. Serial No. 870,013.

*To all whom it may concern:*

Be it known that I, CHARLES A. YOUNGMAN, a citizen of the United States, and a resident of Louisville, in the county of Jefferson and State of Kentucky, have invented certain new and useful Improvemnts in Filters, of which the following is a specification.

My invention relates to the filtration of liquids, particularly to the filtering and clarifying of whiskies, wines, beers, etc., and one of the main objects thereof is to provide a relatively enormous area of the filtration medium within a relatively small compass. A further object is to provide a rack for supporting the said medium which permits of ready and easy installation and removal of the medium; a further object is to provide means for positively preventing leakage of the liquid being filtered, except through the medium; and further objects are to provide such devices which are simple in construction, positive of result, of relatively great filtration capacity, composed of few parts not likely to get out of order, and comparatively inexpensive.

My invention is fully described in the following specification, of which the accompanying drawings form a part, in which like parts are designated by like reference characters in each of the views, and in which:—

Figure 1 is an end elevation of my filter in position for use within a tank shown in section; Fig. 2 is a side elevation thereof, removed from the tank, and partly in section on the line 2—2 of Fig. 4; Fig. 3 is a transverse, vertical, section, the upper half on the line 3—3 and the lower half on the line 3'—3' of Fig. 4; Fig. 4 is a section taken on the line 4—4 of Fig. 2; Fig. 5 is a section taken on the line 5—5 of Fig. 1; and Fig. 6 is a section taken on the line 6—6 of Fig. 5.

In the drawings forming a part of this application I have shown one form of embodiment of my invention, comprising a receptacle or tank 7, open at its top, and having an outlet controlled by a valve 8, Fig. 1, said receptacle being adapted to receive the filter and being of any desired size, shape, or material.

The filter proper consists of a rack formed of upper and lower plates 9 and 10 joined at their ends by means of vertical bars 11 and a plurality of vertical, spaced, rods 12, at each side thereof, and in permanent connection with corresponding fingers 13 formed on the upper and lower plates 9 and 10 by means of relatively deep, inwardly convergent, slots 14, the fingers of each plate registering with the corresponding fingers of the other plate, whereby said rods are perpendicular to both plates, and equidistant from each other, the parts thus far described being integral, and the sides of the said fingers are grooved at 15 midway between the upper and lower surfaces of the corresponding plates, whereas the bars 11 are longitudinally grooved at 16 on each edge thereof.

In practice, a strip of filtering material 17, in the present showing being composed of a layer of fabric and one of paper, is bent to follow the convolutions of the upper and lower plates 9 and 10, the rods 12 serving as the outer support for each convolution, and a removable rod 18 being provided as the inner support for each convolution, between each pair of fingers 13 of said plates, said removable rods being of a greater length than the rack itself whereby they project above and below the same, and the two rods 18 transversely opposite each other and forming a pair are joined by means of a link 19, one for each of the said plates and for each pair of the removable rods, a set-screw 20 being provided for each link whereby the said rods may be firmly forced into the inner ends of the corresponding slots 14 forming the fingers 13, a pair of similar removable rods 18 and links 19 therefor being provided for each of the vertical bars 11, and resting in the grooves 16 thereof, and it will be seen that the filter strip 17 is thus secured in position against accidental removal, and to prevent leakage at each side of the bars 11. In order to prevent leakage at the connection of said filter strip 17 with the edges of the corresponding fingers 13, I provide a continuous length of copper wire 21 which is forced into the grooves 15 of said fingers, the tension applied to the removable rods 18 of each pair also placing the said wire under tension, and a tight casing is thus formed the upper and lower sides of which are of solid material, such as wood or the like, and the wall of which is composed of the filtering material, and there is no escape for liquids in said casing except through the said filtering material.

As clearly shown in Figs. 1 and 4, I provide a pipe 22 which passes through the upper plate 9 and by means of which the liquids to be clarified or filtered are admitted to the casing forming the filter, and I prefer, also, to provide a suitable valve 23 in said pipe and a float 24 for closing the same when the liquid in the receptacle 7 rises above a predetermined height therein, in the event of the valve 8 being closed for any reason, and it will be seen that the liquid admitted through the pipe 22 must filter through the strip 17, at some point of the relatively great filtering area thereof, before it may pass to the valve 8 on its way to the bottles, barrels, casks, or other containers.

When it is desired to remove the filter strip 17, as for cleansing or substitution, all that is necessary is to loosen the set-screws 20, thus releasing the tension on the wire 21 and strip 17, remove the links 19 and removable rods 18, and the said filter strip is free, a new strip being substituted therefor just as expeditionsly.

Because of the relatively great filtering area thus produced, within a tank of a given size, my device possesses a proportionate filtering capacity, and any person can easily and quickly change the filtering strips at any time and without skill.

My device, despite its simplicity, is highly efficient, and well adapted to the purposes for which it is intended, and, while I have shown a present preferred detail construction, I do not limit myself thereto, but may make changes thereover, within the scope of the following claims, without departing from the spirit of my invention or sacrificing its advantages.

Having fully described my invention, what I claim as new, and desire to secure by Letters Patent, is:—

1. A filter, comprising a rack formed of end plates and connecting bars, the edges of said plates being formed into complemental fingers having a groove in the edges thereof, a rod connecting corresponding fingers of said plates, a strip of filtering material extended between said plates and following the configuration of the edges thereof, a wire for locking said strip in said groove, and means for applying tension to said strip between said fingers.

2. A filter, comprising a rack formed of end plates and connecting bars grooved at their edges, said plates having a plurality of fingers formed on their edges, a strip of filtering material extended between said plates, a wire for locking said strip in the groove of said plates, rods for applying tension to said strip and wire, between said fingers, and rods for locking said strip in the grooves of said bars.

In testimony whereof I have signed my name to this specification in the presence of two subscribing witnesses.

CHARLES ALBERT YOUNGMAN.

Witnesses:
LEWIS W. COHN,
L. B. BERNHEIM.

Copies of this patent may be obtained for five cents each, by addressing the "Commissioner of Patents, Washington, D. C."